United States Patent
Könczöl et al.

(10) Patent No.: US 10,408,181 B2
(45) Date of Patent: Sep. 10, 2019

(54) GAS METERING VALVE FOR A DUAL FUEL ENGINE

(71) Applicant: HOERBIGER KOMPRESSORTECHNIK HOLDING GMBH, Vienna (AT)

(72) Inventors: Martin Könczöl, Markt Piesting (AT); Christoph Brandl, Südstadt (AT)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 544 days.

(21) Appl. No.: 15/019,537

(22) Filed: Feb. 9, 2016

(65) Prior Publication Data
US 2016/0245251 A1      Aug. 25, 2016

(30) Foreign Application Priority Data
Feb. 24, 2015  (AT) .............................. A 50141/2015

(51) Int. Cl.
*F02M 21/02*  (2006.01)
*F02M 63/00*  (2006.01)
(Continued)

(52) U.S. Cl.
CPC .... *F02M 63/0012* (2013.01); *F02M 21/0254* (2013.01); *F02M 21/0272* (2013.01);
(Continued)

(58) Field of Classification Search
CPC ............... F02M 21/02; F02M 21/0218; F02M 21/0257; F02M 21/0272; F02M 21/0254;
(Continued)

(56) References Cited

U.S. PATENT DOCUMENTS

| 5,398,724 A | * | 3/1995 | Vars ........................ F02D 41/20 |
| | | | 123/490 |
| 5,868,121 A | * | 2/1999 | Brown ................... F02D 19/027 |
| | | | 123/525 |

(Continued)

FOREIGN PATENT DOCUMENTS

| AT | 502512 | 4/2007 |
| JP | 2007211764 | 8/2007 |

OTHER PUBLICATIONS

English Abstract of JP2007211764.

*Primary Examiner* — Jacob M Amick
*Assistant Examiner* — Michael A Kessler
(74) *Attorney, Agent, or Firm* — Dykema Gossett PLLC

(57) ABSTRACT

The invention relates to a gas metering valve (1) for a dual fuel engine (17), which has a displaceable closing body (6) which, in a position of resting against a valve seat (5), closes the gas metering valve (1) and, in a position of being lifted off from the valve seat (5), opens the gas metering valve (1). The gas metering valve (1) is actuatable in a gas operating mode, in which the gas metering valve (1) meters combustion gas via a gas channel (13) into an intake manifold (15) of the dual fuel engine (17), and in a liquid fuel operating mode, in which the gas metering valve (1) remains sealingly closed against the pressure prevalent in the intake manifold (15). The valve seat (5) is movably situated along a valve seat guide (4), the valve seat (5), owing to the combustion gas pressure in the gas channel (13), in the gas operating mode being pressed away from the closing body (6) against a stop (20) in the gas metering valve (1) and is kept in its operating position, and the valve seat (5) in the liquid fuel operating mode being sealingly pressed by the pressure from the intake manifold (15) against the closing body (6).

6 Claims, 2 Drawing Sheets

(51) Int. Cl.
*F04B 39/10* (2006.01)
*F04B 53/10* (2006.01)
*F02M 43/00* (2006.01)

(52) U.S. Cl.
CPC ........ *F02M 43/00* (2013.01); *F02M 63/0017* (2013.01); *F02M 63/0063* (2013.01); *F04B 39/1053* (2013.01); *F04B 53/1082* (2013.01); F02M 63/0033 (2013.01); F02M 2200/16 (2013.01); F02M 2547/00 (2013.01); Y02T 10/32 (2013.01); Y02T 10/36 (2013.01)

(58) Field of Classification Search
CPC ........ F02M 2547/00; F02M 2547/006; F02M 2200/16; F02M 62/0012; F02M 62/0014; F02M 62/0031; F02M 63/0012; F02M 63/0017; Y02T 10/32; Y02T 10/36; Y10T 137/86759; Y10T 137/87426; F04B 39/1053; F16K 31/0655

USPC ............ 251/129.16, 129.07, 54; 137/129.16, 137/129.07, 54
See application file for complete search history.

(56) References Cited

U.S. PATENT DOCUMENTS

| | | |
|---|---|---|
| 6,112,765 A | 9/2000 | Boyer |
| 6,321,725 B1 | 11/2001 | Krimmer et al. |
| 8,272,399 B2 | 9/2012 | Farrow et al. |
| 8,720,488 B2 | 5/2014 | Ranegger et al. |
| 9,458,798 B2* | 10/2016 | Mitter ................. F02M 21/0278 |
| 2011/0266474 A1* | 11/2011 | Ranegger ........... F02M 21/0272 251/129.01 |
| 2017/0022953 A1* | 1/2017 | Tyler .................. F02M 61/1873 |

* cited by examiner

GAS METERING VALVE FOR A DUAL FUEL ENGINE

BACKGROUND OF THE INVENTION

The present invention relates to a gas metering valve for a dual fuel engine, which has a displaceable closing body which, in a position of resting against a valve seat, closes the gas metering valve and, in a position of being lifted off from the valve seat, opens the gas metering valve, the gas metering valve being actuatable in a gas operating mode, in which the gas metering valve meters combustion gas via a gas channel into an intake manifold of the dual fuel engine, and in a liquid fuel operating mode, in which the gas metering valve remains sealingly closed against the pressure prevalent in the intake manifold.

THE PRIOR ART

Gas metering valves of this kind are, for example, used as intake manifold injections for large bore gas engines, which can be operated in two operating types, namely using combustion gas on the one hand (gas operating mode) and using liquid fuel (liquid fuel operating mode) on the other. Depending on the engine, for example, diesel, bio diesel, heating oil, heavy oil, etc., can be used as liquid fuel; for the gas operating mode, for example, natural gas, sewer gas, bio gas, etc., can be used as combustion gas. For engines for LNG tank ships, combustion gas is extracted from the transported liquefied natural gas (LNG) for the gas operating mode so that the own cargo is also used as fuel.

Engines which can be operated in a gas operating mode and in a liquid fuel mode are commonly referred to as dual fuel engines, and not only large bore engines but also smaller engines, for example, for operating small power stations or generators, can be implemented as dual fuel engines.

In dual fuel engines operating according to the so-called "ported-fuel principle," the combustion gas is inserted into the intake manifold of the engine in the gas operating mode. In contrast, there are also engines in which the combustion gas is inserted directly into the combustion chamber, which, however, requires completely different properties of the gas metering valve.

In a dual fuel engine operating according to the ported-fuel principle, the gas metering valve, in the gas operating mode, controls the supply of combustion gas to the intake manifold of the engine where the combustion gas is mixed into the charge air compressed by the turbo charger. In this instance, the combustion air pressure in the gas metering valve is considerably higher than the air charging by way of the turbo so that the closing body of the gas metering valve in a closed valve position is always tightly pressed against the stop surface of the valve seat. Hence, only a small return force (for example, by way of a return spring) has to be generated for the closing body. In order to open the valve, the closing body is lifted off the valve seat against the jointly acting force of the return spring and of the combustion air pressure by an electromagnet so that the combustion gas flows into the intake manifold in a metered manner.

In the liquid fuel operating mode, the supply of combustion gas is interrupted and the gas metering valve is closed. The interrupted gas supply lowers the pressure in the interior of the gas metering valve; however, at the same time, the pressure in the intake manifold remains at the same level because the dual fuel engine continues to operate and is supplied with liquid fuel. For this reason, the relatively weakly dimensioned return spring of the closing element now presses onto the valve seat. Since the return spring in the gas operating mode works against the magnet, the spring force is limited and, for this reason, the maximum pressure difference between the charge of the charge air and the pressure in the interior of the valve is also limited. In cases of high charge pressures, the closing body, for this reason, can lift off from the valve seat and compressed air and dirt can penetrate into the valve. For generic valves, a lifting off can already take place against the main direction at a pressure difference of, for example, 0.5 bar.

AT 509737 A1, which has been submitted by the applicant of the present invention, discloses a dry running gas valve for supplying gaseous fuel into the air stream of an internal combustion engine. The valve has been particularly developed for large bore engines and can also be used for dual fuel engines; however, the above-mentioned problems can arise. The switchable pressure difference of valves of this kind is at approximately 10 bar (without pressure compensation), the value being dependent, inter alia, on the valve type and the number of flow slots in the valve seat. The charge air pressure is typically within a range of between 0 and 9 bar[g], and the combustion gas pressure in a range of 0 and 10 bar[g], the combustion gas pressure in the gas operation being respectively adjusted to the currently prevalent charge air pressure.

In contrast to the gas metering valves which blow combustion gas into the charge air, gas metering valves exist which are provided to meter the gas directly into the combustion chamber. Since the pressure in the combustion chamber in dual fuel engines can be up to 200 bar (up to 150 bar for strictly gas engines), these valves have a completely different structure than gas metering valves which feed the combustion air into the charge air. For the injection into the combustion chamber, gas metering valves have to be provided with an additional return valve to prevent that after ignition backfiring from the combustion chamber into the combustion gas valve occurs.

AT 502512 A4, which also has been submitted by the applicant of the present invention, discloses such a combustion gas valve for the combustion chamber of a reciprocating piston gas engine, the return valve being integrated in the combustion gas valve. The combustion gas valve has a movable valve seat plate, which is pressed by a separate return valve against a stop and which functions as a return valve to prevent an opening of the valve during pressure peaks on the side of the combustion chamber, for example, after ignition. In this instance, the return spring for the valve seat plate has to be configured in a much stronger manner than the valve spring for the closing body because the valve seat plate acting as return valve has to be quickly returned to its working position after each deflection to ensure the timely opening of the combustion gas valve during the next intake stroke. The adjustable pressure difference of valves of this type is generally at 17.5 bar[g].

The substantial functional difference between combustion gas valves, which meter combustion gas directly into the combustion chamber (such as the valve of AT 502512 A4) and the gas metering valves, which meter the gas into the intake manifold (these are also referred to as "ported-fuel injectors") and which are the subject matter of the present description, is in that the direct injection is a highly dynamic process, which has to occur within the course of each charge cycle, while, in the case of in-feeding combustion gas into the intake manifold, a quasi-static process is involved.

It is the object of the present invention to create a gas metering valve for dual fuel engines, which safeguards a safe gas operating mode and which, furthermore, ensures that the gas metering valve always remains closed and sealed during the liquid fuel operating mode of the dual fuel mode.

SUMMARY OF THE INVENTION

According to the present invention, this goal is achieved by a gas metering valve of the art mentioned at the outset, in which the valve seat is movably situated along a valve seat guide, the valve seat in the gas operating mode, owing to the combustion gas pressure in the gas channel, being pressed away from the closing body against a stop in the gas metering valve and being kept in its operating position, and the valve seat in the liquid fuel operating mode being sealingly pressed by the pressure in the intake manifold against the closing body. In the liquid fuel operating mode, the closing body is typically pressed by a valve spring in the closed position against the valve seat, which, for this reason, is pressed against the stop. As soon as the pressure in the intake manifold rises to such a level that the force acting from the direction of the intake manifold onto the valve seat exceeds the force of the valve spring, the valve seat moves away from the stop and pushes the closing body also against the force of the valve spring into the valve interior. The maximum deflecting position is reached as soon as the closing body has reached its maximum deflection. When the pressure in the intake manifold declines, the valve spring can push the unit out of closing body and valve seat back into the starting position until the valve seat abuts against the stop. During the entire deflection of the valve seat, the closing body remains tightly pressed against the valve seat. Thus, an undesired lifting-off of the closing body from the valve seat and a therefrom resulting opening of the valve during the liquid fuel operating mode is not possible.

In an advantageous embodiment, the valve seat can have a closing body guide directed towards the closing body and projecting from the valve seat, on which closing body guide the closing body is movably mounted. This not only realizes the advantages which have become known from AT 509737 A1 in the gas operating mode but, moreover, has also the advantage according to the present invention that the unit made of valve seat, closing body guide and closing body moves jointly in the liquid fuel operating mode and that no tolerance errors can arise between the guide of the valve seat and the guide of the closing body, which possibly can impact the tightness at the valve seat during the movement of the valve seat.

In an advantageous manner, the valve seat can be configured as a plurality of circular, concentric slots. In this instance, the closing body has a corresponding number of concentric rings which are connected to one another by radial webs distributed about the circumference and which are, for closing the valve, pressed against the concentric slots of the valve seat and which are sealing said concentric slots. In doing so, a minimal valve lift can be achieved.

In a further advantageous embodiment of the present invention, the closing body can be connected to an armature plate, which is operated by an electromagnet. In an advantageous manner, the electromagnet in this instance can be situated in a magnet-base, which is centrally located in the gas channel. In doing so, a very compact architecture can be achieved.

In one advantageous embodiment, the gas metering valve can be a dry running gas metering valve.

In an advantageous manner according to the present invention, in the valve seat guide respectively one sealing element can be situated on each side of the stop to protect the stop from pollutants.

BRIEF DESCRIPTION OF THE DRAWINGS

The present invention is subsequently described in more detail in reference to FIGS. 1 through 3, which show advantageous embodiments of the present invention in an exemplary, schematic and non-limiting manner.

DETAILED DESCRIPTION

Figure 1:
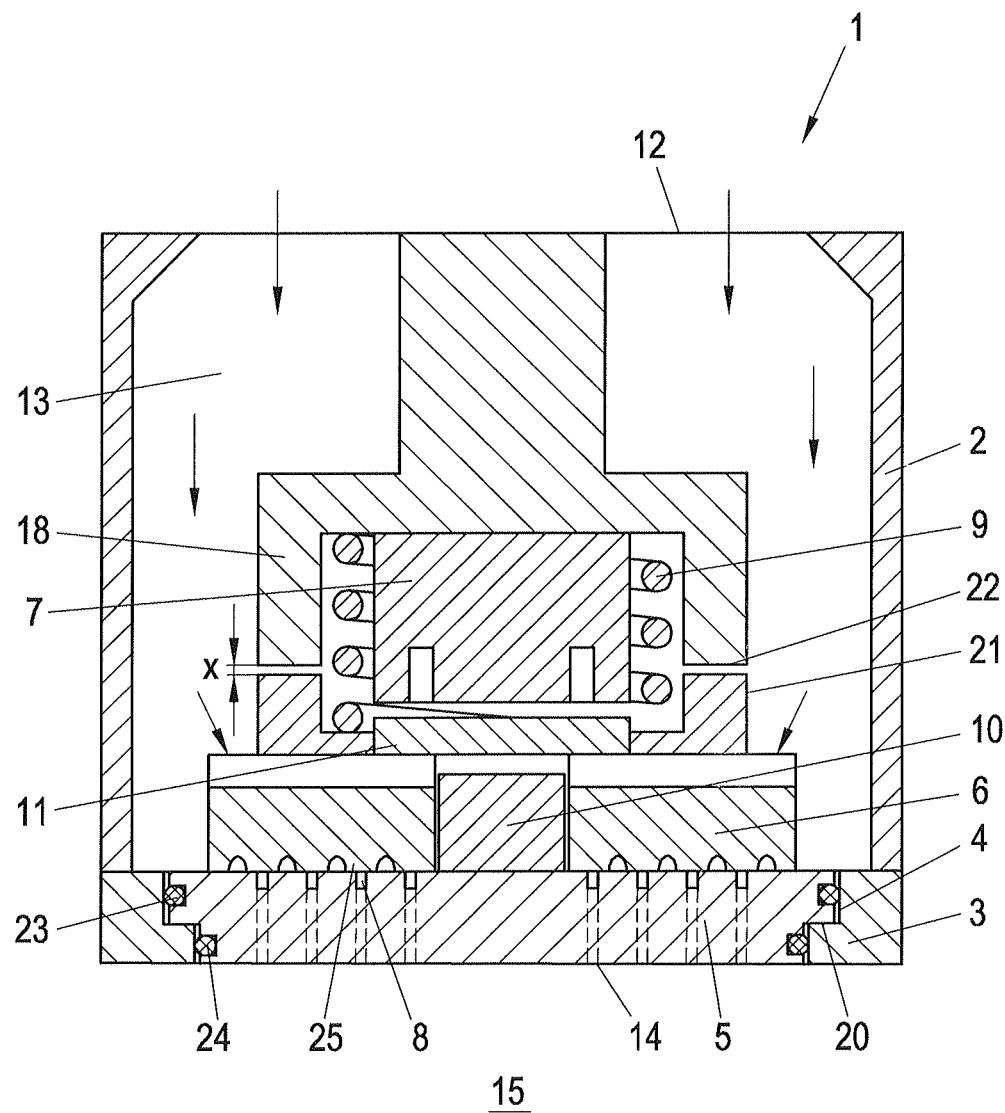
FIG. 1 shows the gas metering valve according to the present invention in a sectional view along the main axis.
Figure 3:
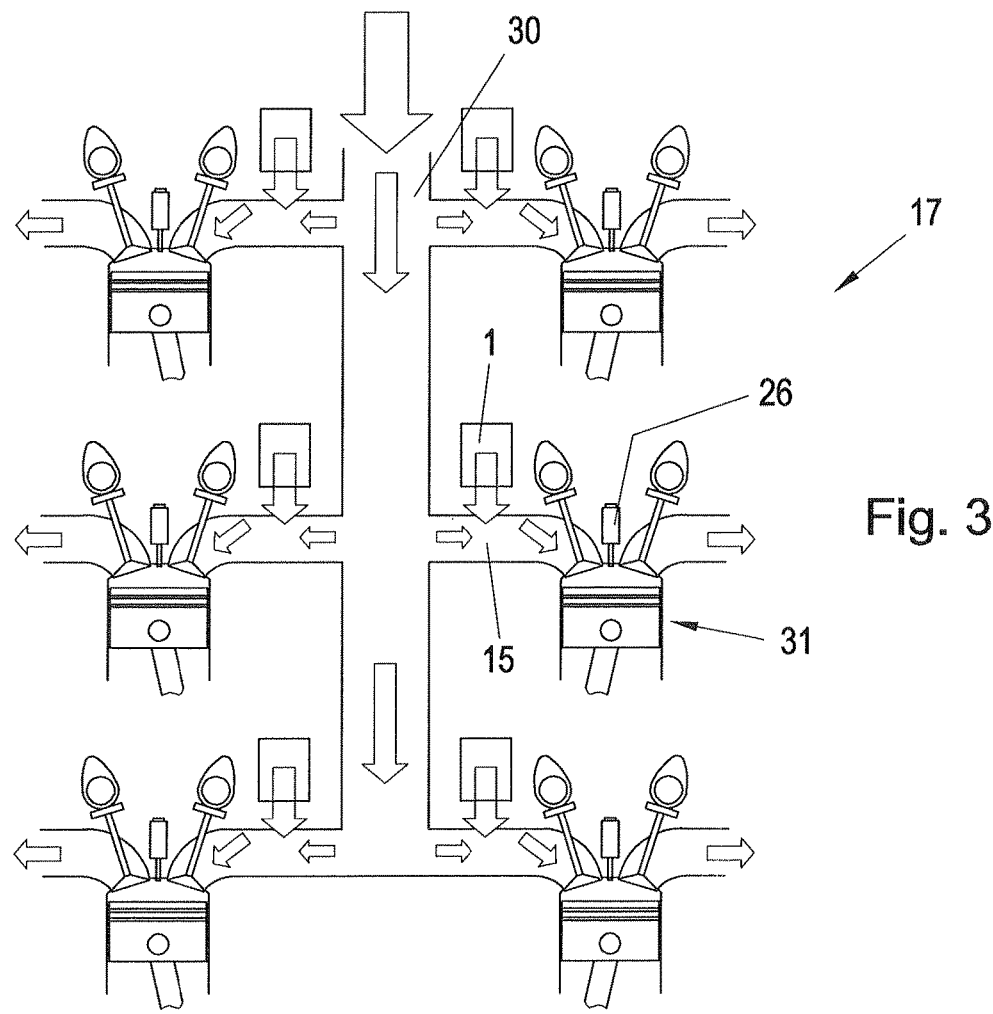
FIG. 3 shows a schematic illustration of the cylinders of a dual fuel engine equipped with the gas metering valve.

Gas metering valve 1 according to the present invention and shown in FIG. 1 has a housing 2 in which a gas channel 13 is provided being through-flown by the metered combustion gas. The combustion gas enters gas metering valve 1 through a gas inlet 12, through-flows gas channel 13 and enters by way of a gas outlet 14 an intake manifold 15 which leads to combustion chamber 16 of a dual fuel engine 17 (FIG. 3). In the region of gas outlet 14, a valve seat 5 is located, which has a plurality of circular, concentric slots 8, which can be selectively closed or unblocked by a closing body 6. Closing body 6 has a corresponding number of concentric rings 25 which are connected to one another by radial webs distributed about the circumference and which are, for closing the valve, pressed against the concentric slots 8 of valve seat 5 and which are sealing said concentric slots.

In order to actuate gas metering valve 1 illustrated in FIG. 1, a magnet-base 18, in which an electromagnet 7 is located, is situated in the gas channel 13. Upon activation, electromagnet 7 pulls an armature plate 11 and closing body 6 connected to armature plate 11 against the force of a return spring 9 into the opened valve position. A stop ring 21 is provided at closing body 6 which, in the open valve position, is deposited at a stop surface 22 of magnet-base 18. As soon as electromagnet 7 is deactivated, the unit made of armature plate 11, stop ring 22 and closing body 6 is pushed away from electromagnet 7 by return spring 9 and closing body 6 is deposited against valve seat 5. In a valve seat guide 4, valve seat 5 is movably mounted and is pressed against a stop 20 by the pressure of the combustion gas so that the position of valve seat 5 is always defined during the gas operating mode of dual fuel engine 17. Valve seat guide 4 and stop 20 are configured at the interior wall of a valve seat sleeve 3 which is connected to housing 2.

The position illustrated in FIG. 1 corresponds with the closed valve position in the gas operating mode, the distance between stop ring 21 and stop surface 22 of magnet-base 18 corresponding with valve clearance x.

The relationship of the surface of valve seat 5 facing closing body 6 to the surface of valve seat 5 facing intake manifold 15 is selected in such a manner that the pressure of the combustion gas acting from gas channel 13 upon valve seat 5 during the gas operating mode always exerts a greater force onto valve seat 5 in the axial direction than the force exerted by the maximum pressure in intake manifold 15 onto valve seat 5 in the opposite direction. In doing so, it is ensured that valve seat 5 during the gas operating mode is always kept in the position defined by stop 20 so that the function of valve seat 5 corresponds to that of a fixed valve seat in a generic gas metering valve. An additional tensioning device or spring which pretensions valve seat 5 in the direction of stop 20 is thus not required.

A conical closing body guide 10 is provided in the center of valve seat 5, which is fixedly connected to valve seat 5 and projects from valve seat 5 in the direction of the armature plate. When opening and closing gas metering valve 1, closing body 6 slides on closing body guide 10 which positions, centers and guides said closing body during the opening and closing movement.

During the liquid fuel operating mode of dual fuel engine 17, electromagnet 7 is deactivated and return spring 9 presses closing body 6 against valve seat 5 so that gas metering valve 1 remains closed. When the combustion gas supply is closed, the gas pressure in gas channel 13 declines. For this reason, closing body 6 is pressed against valve seat 5 exclusively by the force of return spring 9, the pressure in intake manifold 15 continuously being maintained when operating dual fuel engine 17 with liquid fuel. Pressure differences between the intake manifold pressure and the gas pressure in the interior of the valve and pressure peaks arising when operating the turbo charger can then for generic valves result in that the pressure force acting upon the closing body through the slots of the valve seat exceeds the force of the return spring which, for a generic charge cycle valve, would lead to that the closing body lifts off the valve seat and charge air having therein contained pollutants would penetrate into the gas metering valve, as a result of which said gas metering valve can be damaged. Since a stronger spring tension of the return spring would also require a stronger dimensioning of the electromagnet, one, is intended to keep the spring tension as low as possible to minimize costs and the dimensions of the gas metering valve. For this reason, an increase in spring tension is generally not desired.

In contrast, in the case of gas metering valve 1 according to the present invention and illustrated in FIG. 1, stop 20 safeguards valve seat 5 only against a movement in the direction of intake manifold 15. Since the pressure in intake manifold 15 does not only act upon the surfaces of rings 25 of closing body 6, which are exposed by the slots of valve seat 5, but also upon the much greater surface of movable valve seat 5, which is oriented towards intake manifold 15, the pressure in intake manifold 15 cannot lift off closing body 6 from valve seat 5, even when the spring tension of return spring 9 is rather low, because valve seat 5 would be continuously pressed against closing body 6 and because valve seat 5, together with closing body guide 10 and closing body 6, as a unit moves axially in the direction of the valve interior until stop ring 21 abuts at stop surface 22 of magnet-base 18. When the pressure in intake manifold 15 declines again, the return spring pushes the unit out of closing body 6, valve seat 5 and closing body guide 10 back into the starting position, in which valve seat 5 abuts stop 20. The sealing function of the gas metering valve is ensured for the entire deflection movement of the unit out of closing body 6, valve seat 5 and closing body guide 10 during the liquid fuel operating mode.

Valve seat guide 4 is sealed vis-à-vis valve seat 5 by way of two sealing elements 23, 24, which are respectively situated above and below the step of stop 20. Sealing elements 23, 24 are preferably O-rings, which are situated in annular grooves at the circumferential surface of valve seat 5. In addition to the sealing function, sealing elements 23, 24 also act as scrapers for pollutants during the movements of the valve seat, which have penetrated into the gap between valve seat 5 and valve seat sleeve 3. In order to ensure the sealing function, a single sealing element would suffice; however, it is advantageous to protect stop 20 from both sides from pollutants because, when dirt accumulates on stop 20, the resting position of valve seat 5 (that is, the position during the gas operating mode) is no longer accurately defined, and the distance between closing body 6 and the valve seat would, during a complete lifting-off of the closing body, be altered or even, seen in the radial direction, be uneven if the valve seat were obliquely situated in valve seat guide 4.

Figure 2:
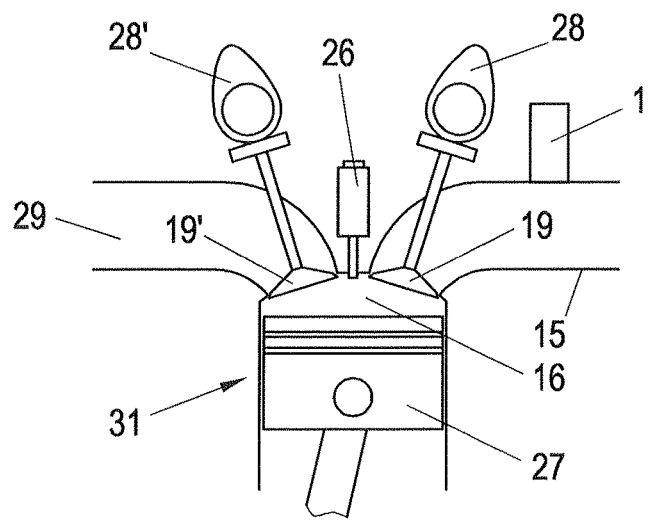
FIG. 2 shows a schematic illustration of one cylinder of a dual fuel engine equipped with the gas metering valve.

FIG. 2 shows a schematic illustration of a cylinder 31 of a dual fuel engine 17 equipped with a gas metering valve 1 according to the present invention. Gas metering valve 1 is situated in the intake manifold just upstream of charge cycle valve 19. In FIG. 2, gas metering valve 1 is schematically illustrated, the potential technical configurations of the gas supply, which, for example, can be implemented in intake manifold 15 as an annular channel having openings and enclosing intake manifold 15, are known to the skilled person. In a known manner, charge cycle valve 19 opens and closes the inlet to combustion chamber 16 of cylinder 31 during the intake stroke according to the position of piston 27. Charge cycle valve 19 is operated by a camshaft 28. A second camshaft 28' operates a second charge cycle valve 19' to discharge during the exhaust stroke the exhaust gases into an exhaust gas line 29. During the liquid fuel operating mode, in which gas metering valve 1 is deactivated, liquid fuel is injected in a known manner via a direct injection 29 directly into combustion chamber 16.

FIG. 3 shows a schematic illustration of a dual fuel engine 17 equipped with the gas metering valve, having six cylinders, each of which are configured according to FIG. 2. The charge air is supplied to the cylinders via a joint charge air supply 30 by way of individual intake manifolds 15. One gas metering valve 1 is situated at each intake manifold 15 which, in the gas operating mode, supplies the cylinder 31 with combustion gas, and each cylinder is, furthermore, provided with a direct injection 26 for the liquid fuel operation.

LIST OF REFERENCE CHARACTERS

1 Gas metering valve
2 Housing
3 Valve seat sleeve
4 Valve seat guide
5 Valve seat
6 Closing body
7 Electromagnet
8 Slots
9 Return spring
10 Closing body guide
11 Armature plate
12 Gas inlet
13 Gas canal
14 Gas outlet
15 Intake manifold
16 Combustion chamber
17 Dual fuel engine
18 Magnet-base
19, 19' Charge cycle valve
20 Stop
21 Stop ring
22 Stop surface
23 Gas channel sided sealing element 24 Intake manifold sided sealing element
25 Rings
26 Direct injection
27 Piston
28, 28' Camshaft
29 Exhaust gas line
30 Charge air supply
31 Cylinder

What is claimed is:

1. A gas metering valve for dual fuel engines and operable in a gas operating mode or a liquid fuel operating mode, said valve comprising:
 a housing which provides a gas inlet opening at a first end, a gas channel and a gas outlet opening,
 a seat sleeve at said gas outlet opening providing a seat guide and a seat stop,
 a valve seat positioned within said seat sleeve, said valve seat being movable along said seat guide, and
 a closing body in an interior of the housing and movable toward and away from the valve seat,
 the valve seat being movably mounted along the seat guide and is pressed against the stop to close the device by gas in the interior of the housing when in the gas operating mode, and wherein the valve seat is sealingly pressed against the closing body in the liquid fuel operating mode.

2. The valve according to claim 1, wherein said closing body includes a hole therethrough and said valve seat includes a body guide which extends into said hole, said closing body being moveable along said body guide toward and away from the valve seat.

3. The valve according to claim 1, wherein said valve seat comprises a plurality concentric circular slots.

4. The valve according to claim 1, including a electromagnet and an armature plate in the interior of the housing, the closing body being connected to the armature plate.

5. The valve according to claim 4, including a magnet base centrally positioned in the gas channel, said electromagnet being positioned in the magnet base.

6. The valve according to claim 1, including separate sealing elements within the seat sleeve respectively located on opposite sides of said stop.

* * * * *